United States Patent
Katayama et al.

(12) 
(10) Patent No.: US 6,267,148 B1
(45) Date of Patent: Jul. 31, 2001

(54) CONDUCTIVE RESIN TUBE AND CONDUCTIVE POLYAMIDE RESIN COMPOSITION

(75) Inventors: Kazutaka Katayama, Inuyama; Hiroaki Itoh, Kasugai; Koyo Murakami, Nagoya, all of (JP)

(73) Assignee: Tokai Rubber Industries, Ltd., Aichi-Ken (JP)

( * ) Notice: Subject to any disclaimer, the term of this patent is extended or adjusted under 35 U.S.C. 154(b) by 0 days.

(21) Appl. No.: 09/211,252

(22) Filed: Dec. 14, 1998

(30) Foreign Application Priority Data

Dec. 15, 1997 (JP) ..................................................... 9-344910

(51) Int. Cl.⁷ ........................... B32B 27/18; B32B 27/34; F16L 11/20; F16L 11/127
(52) U.S. Cl. ......................... 138/137; 138/140; 428/36.9; 428/36.91; 428/36.92; 428/413; 428/475.8; 428/476.1; 523/215; 524/251
(58) Field of Search ................................ 428/36.9, 36.91, 428/36.92, 413, 475.8, 476.1; 138/137, 140; 523/215; 524/251

(56) References Cited

U.S. PATENT DOCUMENTS

| | | | |
|---|---|---|---|
| 4,196,464 | * | 4/1980 | Russell ................................. 361/215 |
| 4,876,301 | * | 10/1989 | Peerlkamp et al. ................... 524/255 |
| 5,229,442 | * | 7/1993 | Broussard et al. ..................... 524/87 |
| 5,271,977 | * | 12/1993 | Yoshikawa et al. ................. 428/35.9 |

FOREIGN PATENT DOCUMENTS

| | | |
|---|---|---|
| 58-173155A | 10/1983 | (JP) . |
| 1-011161A | 1/1989 | (JP) . |
| 7-286103A | 10/1995 | (JP) . |

\* cited by examiner

*Primary Examiner*—Harold Pyon
*Assistant Examiner*—Sandra M. Nolan
(74) *Attorney, Agent, or Firm*—Louise A. Foutch; Dennis G. LaPointe; Mason & Assoc., P.A.

(57) ABSTRACT

A conductive polyamide resin composition containing 6–15 parts of conductive carbon black and 0.3–5 parts of secondary aromatic amines for 100 parts by weight of polyamide resins is excellent in formability and a tube manufactured using the composition is excellent in conductivity, heat-aging resistance and oxygenated-gasoline resistance as well.

8 Claims, No Drawings

CONDUCTIVE RESIN TUBE AND CONDUCTIVE POLYAMIDE RESIN COMPOSITION

FIELD OF THE INVENTION

The present invention relates to a polyamide-based electrically conductive resin composition and products using the same. More particularly, the present invention relates to a polyamide-based electrically conductive resin composition which has an improved heat-aging resistance and oxygenated-gasoline (i.e. sour gasoline) resistance as well as an excellent balance of physical properties such as fuel oil resistance, antistatic characteristics, elongation, flexibility and the like and is useful as an inner tube material, and a tube using the same.

BACKGROUND OF THE INVENTION

Resin materials endowed with conductivity are used in a very wide range of applications such as anti-electrostatic products, surface-exothermic materials, CV cables, electrically conductive paints and ink, IC packing materials, shielding materials for electromagnetic waves and the like. There are also used resin tubes endowed with conductivity for the purpose of transporting fuel so as to remove static electricity generated by friction during the transportation and induced by charged gasoline through the filter.

As a means to impart conductivity to the resin, a method of adding to a resin, for example, carbonaceous materials like carbon black as a typical example is the most commonly conducted [JP-A-H07-286103 (1995) and JP-B-H08-13902 (1996), wherein the term "JP-A" as used herein means a laid-open publication for an unexamined application while the term "JP-B" means a publication after examined.] and, as for polyamide resin, it is well-known that an electrically conductive polyamide resin can be obtained by the mixing with conductive carbon black. There is a defect, however, that the heat-aging resistance of a polyamide resin is reduced when mixed with the conductive carbon black. Moreover, when such a resin is used as a tube for fuel oil, the oxygenated-gasoline resistance is far below the satisfactory level.

The addition of a phenolic or organophosphate heat-resistant stabilizer to a polyamide resin in order to improve heat-aging resistance is commonly known in the art but the effect is little in a polyamide resin mixed with the conductive carbon black and scarcely serves to an improvement.

JP-B-H03-61701 (1991) disclosed a method for improving heat-aging resistance by mixing polyamide containing conductive carbon black with copper iodide and potassium iodide. However, since copper iodide and potassium iodide are not compatible with a polyamide resin, it is difficult to make them uniformly dispersed in the resin. They also give rise to a problem that the surface condition of a tube obtained by extrusion (i.e. skin of the hose manufactured by extrusion) is deteriorated. Additionally, the oxygenated-gasoline resistance has been little improved.

There is also a report on the study of the effect of preventing oxidation by adding a phenol, secondary amine, hindered amine antioxidant to a monomer of nylon 6 (6-hexanelactam) [Lanska, B., Poly. Degrad. Stab., 53 (1996) 99–109] but this method does not relate to the addition of carbon black and the report does not investigate the effect of the antioxidant with regard to preventing aging deterioration of physical properties of nylon.

SUMMARY OF THE INVENTION

It is therefore an object of the present invention to provide a resin composition which is excellent in electrical conductivity, heat-aging resistance and oxygenated-gasoline resistance.

It is another object of the present invention to provide a tube produced by using the resin composition having excellent conductivity, heat-aging resistance and oxygenated-gasoline resistance.

We have investigated additives which can improve both heat-aging resistance and oxygenated-gasoline resistance of an electrically conductive polyamide mixed with conductive carbon black and have found that secondary aromatic amines can improve heat-aging resistance and oxygenated-gasoline resistance of the conductive polyamide resin.

Accordingly, the present invention provides following conductive polyamide resin compositions and tubes manufactured by using the same.

(1) A conductive resin tube comprising one or more layers, wherein at least the most inner layer of the said tube comprising a conductive polyamide resin composition containing from 6 to 15 parts by weight of conductive carbon black and from 0.3 to 5 parts by weight of secondary aromatic amine for 100 parts by weight of a polyamide resin.
(2) The conductive resin tube as described in the above (1), wherein the polyamide resin is nylon 11 or nylon 12.
(3) The conductive resin tube as described in the above (1), wherein the tube has an outer layer comprising materials selected from a group of polyamide, epichlorohydrin rubber, NBR, a mixture of NBR with polyvinyl chloride, chlorosulfonated polyethylene rubber, chlorinated polyethylene rubber, acrylic rubber(ACM), chloroprene rubber(CR), ethylene-propylene rubber(EPR), ethylene-propylene diene rubber(EPDM), NBR-EPDM blend rubber and a thermoplastic elastomer containing vinyl chloride, olefin, ester or amide.
(4) The conductive resin tube as described in the above (1), wherein the tube is used for the transport of fuel oil.
(5) The conductive resin tube as described in any of the above (1) to (4), wherein the secondary aromatic amine is selected from a group of phenyl-α-naphthylamine, phenyl-β-naphthylamine, N-phenyl-N'-(p-toluene-sulfonyl)-p-phenylenediamine, 4,4'-bis(α,α-dimethyl-benzyl)-diphenylamine, reaction products of diphenylamine with acetone, reaction products of diphenylamine and aniline with acetone, substituted diphenylamine, N,N'-diphenyl-p-phenylenediamine and N,N'-di-2-naphthyl-p-phenylenediamine, octylated diphenylamine, N,N'-diphenyl-p-phenylenediamine, N,N'-di-2-naphthyl-p-phenylenediamine, N-phenyl-N'-isopropyl-p-phenylenediamine, N-phenyl-N'-(1,3-dimethylbutyl)phenylenediamine.
(6) A conductive resin tube structure comprising a single- or multi-layer conductive resin tube and a protective member disposed partially or totally on the outer peripheral surface of the tube, at least the most inner layer of the said tube comprising a conductive polyamide resin composition containing from 6 to 15 parts by weight of conductive carbon black and from 0.3 to 5 parts by weight of secondary aromatic amine for 100 parts by weight of a polyamide resin.
(7) The conductive resin tube structure as described in the above (6), wherein the protective member is a member of solid or sponge form comprising a material selected from ethylene-propylene rubber(EPR), ethylene-propylene diene rubber(EPDM) and a thermoplastic elastomer containing vinyl chloride or olefin.
(8) The conductive resin tube as described in the above (6) or (7), wherein the secondary aromatic amine is selected from a group of phenyl-α-naphthylamine, phenyl-β-naphthylamine, N-phenyl-N'-(p-toluene-sulfonyl)-p-phenylenediamine, 4,4'-bis(α,α-dimethyl-benzyl)-diphenylamine, reaction products of diphenylamine with acetone, reaction products of diphenylamine and aniline with acetone, substituted diphenylamine, N,N'-diphenyl-p-phenylenediamine and N,N'-di-2-naphthyl-p-phenylenediamine,octylated diphenylamine, N,N'-diphenyl-p-phenylenediamine, N,N'-di-2-naphthyl-p-phenylenediamine, N-phenyl-N'-isopropyl-p-phenylenediamine, N-phenyl-N'-(1,3-dimethylbutyl) phenylenediamine.

(9) A conductive polyamide resin composition containing from 6 to 15 parts by weight of conductive carbon black and from 0.3 to 5 parts by weight of secondary aromatic amine for 100 parts by weight of a polyamide resin.

(10) A shaped article comprising the composition of the polyamide resin described in the above (9).

DETAILED DESCRIPTION OF THE INVENTION (1) Resin Compositions

The composition of the conductive resin of the present invention contains a polyamide resin, conductive carbon black and a secondary aromatic amine as essential constituents and may contain other constituents if desired. Each of these constituents will be described in detail hereinafter.

(a) Polyamide

Polyamide over a wide range can be used in the conductive composition of the present invention. Examples of the polyamide include a polymer of a lactam or a aminocarboxylic acid such as ε-caprolactam (i.e. 6-hexanelactam), 6-aminocaproic acid, ω-enanthlactam, 7-aminoheptanoic acid, 9-aminononanoic acid, 11-aminoundecanoic acid, ω-laurolactam, 12-amino-dodecanoic acid, α-pyrrolidone, α-piperidone; a polymer obtained by condensation polymerization of a diamine such as hexamethylene diamine, nonamethylene diamine, undecamethylene diamine, dodecamethylene diamine, methaxylylene diamine, 1,4-bis(aminomethyl) cyclohexane with a dicarboxylic acid such as terephthalic acid, isophthalic acid, adipic acid, sebacic acid, dodecanoic diacid, cyclohexane dicarboxylic acid; a copolymer comprising two or more monomers of the above-mentioned substances. A mixture of these polymers or copolymers can be used as well.

In addition, a copolymer containing constituents of these polymers or copolymers and the polyamide chains is also usable. Examples of such copolymers include elastomer such as polyetheramide or polyesteramide obtained by copolymerizaton with soft segments of polycaprolactone, polytetramethylene glycol and the like.

Among these polyamides, nylon, which is a polyamide consisting mainly of aliphatic chains, exhibits an excellent flexibility and impermeability of gasoline and is preferable, and in particular nylon 11, nylon 12 or a polyamide consisting mainly of the monomers thereof (such as 11-aminoundecanoic acid, ω-laurolactam, 12-aminododecanoic acid) are excellent in a balance of flexibility, impermeability of gasoline and shock resistance and exhibit less changes in physical properties caused by moisture absorption and are usable more preferably.

The polyamide has preferably a number average molecular weight of not less than 10,000 from the viewpoint of shock resistance and processability in extrusion.

(b) Conductive carbon black

In general, necessary conditions for being a usable conductive carbon black are that the structure is high structure; that the amount of impurity existing on the particle surface is little; and that the specific surface area is large. In the conductive carbon black of the present invention, DBP oil absorption amount measured in accordance with JIS K 6221-1970 is preferably not less than 300 ml/100 g and the specific surface area based on BET method ($N_2$) is preferably not less than 500 $m^2$/g. Sufficient conductivity may not be obtained if the DBP oil absorption amount or the specific surface area is out of the range specified above.

Examples of the carbon black usable in the present invention include Ketjen Black EC and Ketjen Black EC600JD (product names) manufactured and distributed by AKZO Nobel Corporation of the Netherlands.

The conductive carbon black is used in an amount of from 6 to 15 parts by weight per hundred parts of polyamide resin. If the content is less than 6 parts by weight per hundred parts of polyamide resin, the conductivity of the resin is not stable. If the content exceeds 15 parts by weight per hundred parts of polyamide resin, though the resin conductivity becomes stable, the skin of extruded tubes is significantly deteriorated. Preferably, the carbon black is added in an amount of from 7 to 13 parts by weight per hundred parts of polyamide resin.

(c) Secondary Aromatic Amine

According to the present invention, both the heat-aging resistance and the oxygenated-gasoline resistance of the conductive polyamide resin can be improved by the addition of secondary aromatic amine.

The secondary aromatic amines usable in the present invention are amines in which one or two aromatic groups bind to a nitrogen atom. Examples of such secondary aromatic amines include the following types of compound. Specific examples of each type of compound are shown below. (However, these examples are merely illustrative and the compounds usable in the present invention should not be construed as limited thereto.)

(i) Naphthylamine

Phenyl-α-naphthylamine, phenyl-β-naphthylamine, etc.

(ii) Diphenylamine

Typical examples of the diphenylamines usable in the present invention include substituted diphenylamine such as N-phenyl-N'-(p-toluene-sulfonyl)-p-phenylenediamine, 4,4'-bis(α,α-dimethyl-benzyl)-diphenylamine, 4,4'-dioctyl-diphenylamine; reaction products of acetone with diphenylamine; reaction products of acetone with aniline and diphenylamine; reaction products of diisobutylene and the like with diphenylamine; an alkylated diphenylamine and a mixture of alkylated diphenylamines; a mixture of alkyl- and aralkyl-substituted phenols with an aralkylated diphenylamine; and other substituted diphenylamines and diphenylamine derivatives.

(iii) p-phenylenediamines

Typical examples of the p-phenylenedimine usable in the present invention include phenylenediamines in which at least one of the nitrogen atoms has an aromatic substituent group such as N-N'-diphenyl-p-phenylenediamine, N-isopropyl-N'-phenyl-p-phenylenediamine, N-phenyl-N'-(1,3-dimethylbutyl)phenylenediamine, N-N'-di-2-naphthyl-p-phenylenediamine, N-phenyl-N'-hexyl-p-phenylenediamine, N-phenyl-N'-octyl-p-phenylenediamine, N-chlorohexyl-N'-phenyl-p-phenylenediamine, N-phenyl- N'-(3-methacryloyloxyhydroxypropyl)-p-phenylenediamine; phenylenediamines in which at least one of the nitrogen atoms has an alkyl substituent group comprising five or more carbon atoms such as N,N'-bis(1-methylheptyl)-p-phenylenediamine, N,N'-bis(1-ethyl-3-methylpentyl)-p-phenylenediamine, N-(1,3-dimethylbutyl)-N'-pentyl-p-phenylenediamine; dioctylated phenylenediamine; reaction products of acetone and N,N'-diphenyl-p-phenylenediamine; reaction products of p-phenylendiamines with ketone (for example, acetone) and the like.

A blend or mixture of these or other phenylenediamines may be also used. Examples of such a blend include a mixture of N,N'-diaryl-p-phenylenediamines, a mixture of N-isopropyl-N'-phenyl-phenylenediamine and 6-ethoxy-2,2,4-trimethyl-1,2-dihydroquinoline and such reaction products as mentioned above.

Among these, secondary aromatic amines having low solubility in gasoline are preferably used. Examples of such amines includes phenyl-α-naphthylamine, phenyl-β-naphthylamine; substituted diphenylamine such as N-phenyl-N'-(p-toluene-sulfonyl)-p-phenylenediamine [also referred to as p-(p-toluene-sulfonylamide) diphenylamine] and 4,4'-bis(α,α-dimethylbenzyl)-diphenylamine, N-N'-di-2-naphthyl-p-phenylenediamine, N-phenyl-N'-(1,3-dimethylbutyl)phenylenediamine; N-isopropyl-N'-phenyl-p-phenylenediamine, alkylated diphenylamines such as octylated diphenylamine; N,N'-diphenyl-p-phenylenediamine and the like, reaction products of diphenylamine with acetone, reaction products of diphenylamine with aniline and with acetone, N-N'-di-2-naphthyl-p-phenylenediamine.

The amount of the secondary aromatic amine in the composition of the present invention is from 0.3 to 5 parts by weight per 100 parts of the polyamide resin. If the content is less than 0.3 parts by weight per 100 parts of the polyamide resin, the effect to improve the heat-aging resistance and the oxygenated-gasoline resistance is less. If it is over 5 parts by weight per 100 parts of the polyamide resin, a great deal of bloom occurs. Preferably, the secondary aromatic amine is added in an amount of from 0.5 to 3 parts by weight per 100 parts of the polyamide resin.

(d) Other Components

In the compositions of polyamide resins of the present invention, in order to improve the flexibility of the resin, for example, a plasticizer such as aromatic sulfonamide or p-hydroxybenzoic acid and rubber such as acrylonitrilebutadiene rubber (NBR), hydrogenated NBR, maleic-modified EPR or EPDM and the like can be mixed when necessary.

(II) Shaped Bodies

As in the case of ordinary polyamide resins, various methods for shaping and/or processing are applicable to the electrically conductive polyamide resin of the present invention. Examples of those methods include shaping and/or processing by injection molding, extrusion, blow molding, compression molding, rotational molding, cast molding or powder molding, solution coating, junction and machining. Shapes of the thus formed article are not limited and those in the form of a tube, sheet or any other shape can be manufactured. In terms of use, the shaped bodies include anti-electrostatic products, surface-exothermic bodies, CV cables, electrically conductive paints, electrically conductive ink, IC packing materials, shielding materials for electromagnetic waves and the like. Because the conductive polyamide resin of the present invention is excellent in flexibility and fuel oil resistance, it is useful as a material for the tube for transport of hydrocarbon fluid such as gasoline or light oil.

Accordingly, the present invention provides an electrically conductive resin tube in which the above-mentioned electrically conductive polyamide resins are used and which has an excellent flexibility and heat resistant characteristics. The tube can be manufactured by using a conventional extruder.

The present invention also provides a multi-layer fuel tube comprising two or more layers at least the most inner layer of which is such a conductive resin tube as described above so as to remove static electricity produced by charged fluid, typically, fuel oil. The construction and dimension of the tube depend on uses and applications. For example, a tube having an inner layer being ordinarily about 0.05–0.6 mm in thickness comprising the resin compositions of the present invention and an outer layer being about 0.4–0.95 mm in thickness is useful as a tube for transporting fuel from the gasoline or light oil tank in a vehicle. The thickness of each layer can be changed optionally.

Various types of polyamide as mentioned above, epichlorohydrin rubber, NBR, a mixture of NBR and polyvinyl chloride, chlorosulfonatedpolyethylene rubber, chlorinated polyethylene rubber, acrylic rubber(ACM), chloroprene rubber(CR), ethylene-propylene rubber(EPR), ethylene-propylene diene rubber(EPDM), NBR-EPDM blend rubber and thermoplastic elastomer based on vinyl chloride, olefin, ester, amide and the like can be used as the outer layer. Polyamide and/or rubber of the same kind can be used for the outer layer and/or intermediate layers in consideration of adherence to the material used for the most inner layer. If necessary, the resin layer of the present invention may be disposed between the intermediate layer and the most outer layer as well. The resin layer of the present invention may be disposed as the most inner layer and the most outer layer and materials endowed with strength may be used for the intermediate layer.

Such a multi-layer tube may be manufactured at a time by using a conventional means such as multi-layer extrusion or, alternatively, by a process comprising forming a tube in accordance with the present invention and forming (a) layer(s) made of other materials on the outer surface of the thus formed tube by way of coating, winding or the like method.

A protective member (protector), in a solid or sponge form, composed of ethylene-propylene rubber, ethylenepropylene diene rubber(EPDM) and/or a thermoplastic elastomer based on vinyl chloride or olefin may be disposed partially or totally on the outer peripheral surface of the thus formed multi-layer tube in consideration of stone splash (jumping stone), wear and tear caused by friction with other parts and flame resistance. A porous material in the sponge form can be used for the protective member by using known methods. With such a porous material, a lightweight protective part having an excellent heat insulating properties can be provided. In addition, the material cost can be reduced. Glass fibers may be used to improve the strength of the protective member. The shape of the protective member is not limited but is ordinarily a cylindrical shape or a block-like shape having a concave portion to receive the multi-layer tube. The protective member in a cylindrical shape can be manufactured so as to be closely attached on the multi-layer tube by inserting the tube into the cylindrical member prepared in advance, or by performing coating extrusion of a material for forming a cylindrical member on the multi-layer tube. For the purpose of adhering the both with each other, an adhesive is applied as needed on the inner surface of the protective member or the concave surface, the multi-layer tube is inserted or fitted on the surface and then the both are pressed with each other to form a structure of conductive resin tube which is an integrated body of a multi-layer tube and a protective member.

BEST MODE FOR CARRYING OUT THE INVENTION

The present invention is described by way of working examples in comparison with comparative examples. Materials and test methods used in these examples are shown below.

(I) Materials
(a) Polyamide
(a-1) Nylon 11
  RILSAN BESN O P40TL (produced by ELF ATOCHEM Corp.)
(a-2) Nylon 12
  RILSAN AESN O P40TL (produced by ELF ATOCHEM Corp.)
(b) Conductive carbon black
(b-1) Ket-en Black EC (produced by AKZO Novel Corp.)
  Specific surface area: 1000 m$^2$/g;
  Oil absorption: 350 ml/100 g
(b-2) Ketjen Black EC600JD (produced by AKZO Novel Corp.)
  Specific surface area: 1270 m$^2$/g;
  Oil absorption: 495 ml/100 g
(c) Secondary aromatic amines
(c-1) Secondary aromatic amine-A: p-(p-toluene sulfonyl amide) diphenylamine (product name: Nocrac TD produced by Ouchi Shinko Chemical Inc.)
(c-2) Secondary aromatic amine-B: 4,4'-bis($\alpha,\alpha$-dimethylbenzyl)diphenylamine (product name: Nocrac CD produced by Ouchi Shinko Chemical Inc.)
(c-3) Secondary aromatic amine-C: phenyl-1-naphthylamine (product name: Nocrac PA produced by Ouchi Shinko Chemical Inc.)
(c-4) Secondary aromatic amine-D: octylated diphenylamine (product name: Nocrac AD-F produced by Ouchi Shinko Chemical Inc.)
(c-5) Secondary aromatic amine-E: N,N'-diphenyl-p-phenylenediamine (product name: Nocrac DP produced by Ouchi Shinko Chemical Inc.)
(c-6) Secondary aromatic amine-F: N,N'-di-2-naphthyl-p-phenylenediamine (product name: Nocrac White produced by Ouchi Shinko Chemical Inc.)
(c-7) Secondary aromatic amine-G: N-phenyl-N'-isopropyl-p-phenylenediamine (product name: Nocrac 810-NA produced by Ouchi Shinko Chemical Inc.)
(c-8) Secondary aromatic amine-H: N-phenyl-N'-(1,3-dimethylbutyl)phenylenediamine (product name: Nocrac 6C produced by Ouchi Shinko Chemical Inc.)

(II) Test Method
(i) Surface Resistance (GM213 method)
Samples were extruded in the tube form having a length of "L" and a copper bar (solid cylinder) having a diameter being larger by 0.1 mm than that of the inner diameter "d" of the tube is inserted, by the depth "a", into both ends of the tube to measure the resistance "R" between the solid cylinders and the surface resistance "Rs" was calculated by the following formula:

$$Rs(\Omega/sq)=R\cdot\pi d/(L-2a)$$

(ii) Fuel Oil Resistance
Pseudo oxygenated gasoline [artificially prepared by adding 5% by weight of lauroyl peroxide to the test fuel oil Fuel C (JIS K 6258: toluene 50 vol %+isooctane 50 vol %)] was circulated through a tube-shaped test sample at 60° C. for 360 hours. Then the test tube was cut along the length into halves and bent inversely by an angle of 180° so that its inner layer faces outside. The tube was observed to see if cracking had occurred.

(iii) Mechanical Strength and Heat-aging Resistance
A sheet of 1 mm in length was molded by an injection machine from which a test piece of type IV based on ASTM D-638 was formed by die-cutting and then the elongation at break of the test piece was measured. This test piece was aged thermally at 120° C. for 168 hours and its elongation at break was also measured in the same manner.

EXAMPLE 1–15

Polyamide, conductive carbon black and secondary aromatic amine were placed together in a biaxial extruder in the ratio shown in Tables 1–3 and the mixture was kneaded at 200° C. at a screw rotation rate of 320 rpm and pelletized by extrusion.

By using a two-layer extrusion machine, two-layer tubes were formed having an inner layer being 0.2–0.25 mm in thickness comprising a composition of polyamide, conductive carbon black and secondary aromatic amine (mentioned above) and an outer layer comprising a polyamide of the same kind but no conductive carbon black nor secondary amine was added.

Each of the two-layer tubes was evaluated with regard to the tube formability (by a visual inspection by the naked eyes) and the surface resistance and oxygenated-gasoline resistance of the inner layer of the tubes were measured by the test method described above.

Test pieces comprising each of the compositions of polyamide/conductive carbon black/secondary aromatic amine mentioned above were prepared and the mechanical strength and heat-aging resistance thereof were also measured with the test method described above.

The results are shown in Tables 1–3.

TABLE 1

|  |  | Ex. 1 Phr | Ex. 2 Phr | Ex. 3 phr | Ex. 4 phr | Ex. 5 Phr | Ex. 6 phr | Ex. 7 phr |
| --- | --- | --- | --- | --- | --- | --- | --- | --- |
| Polyamide Resin | Nylon 11 | 100 | 100 | 100 | 100 | 100 | — | — |
|  | Nylon 12 | — | — | — | — | — | 100 | 100 |
| Conductive | Ketjen Black EC | 11 | 11 | 11 | — | 15 | 15 | — |

TABLE 1-continued

|  |  | Ex. 1 Phr | Ex. 2 Phr | Ex. 3 phr | Ex. 4 phr | Ex. 5 Phr | Ex. 6 phr | Ex. 7 phr |
|---|---|---|---|---|---|---|---|---|
| Carbon Black | Ketjen Black EC600JD | 6 | — | — | 8 | — | — | 8 |
| Additives[1)] | Secondary Aromatic amine-A | 0.5 | 1 | — | 3 | 3 | 1 | 3 |
|  | Secondary Aromatic amine-B | — | — | 0.5 | — | — | — | — |
| Tube Formability |  | ○ | ○ | ○ | ○ | ○ | ○ | ○ |
| Surface Resistivity (Ω/sq) |  | $1 \times 10^5$ | $8 \times 10^3$ | $7 \times 10^3$ | $2 \times 10^4$ | $1 \times 10^3$ | $2 \times 10^4$ | $7 \times 10^4$ |
| Bending after Circulation of FC/LP05 wt %[2)] |  | ○ | ○ | ○ | ○ | ○ | ○ | ○ |
| Elongation | Initial % | 300 | 310 | 310 | 300 | 280 | 330 | 350 |
| At Break | After being Aged % | 170 | 180 | 140 | 210 | 180 | 250 | 260 |

*The amounts of carbon black and additives are expressed by phr (parts by weight per hundred parts of polyamide resin).
[1)]Additives:
Secondary Aromatic amine-A: p-(p-toluene sulfonylamide)diphenylamine (Nocrac TD)
Secondary Aromatic amine-B: 4,4'-bis(α,α-dimethyl-benzyl)diphenylamine (Nocrac CD)
[2)]FC/LP05 wt %: Artificially prepared oxygenated gasoline (Fuel Oil C containing 5 wt lauroyl peroxide)
Evaluation of bending:
○ = No abnormality;
X = Occurrence of crack

TABLE 2

|  |  | Ex. 8 Phr | Ex. 9 Phr | Ex. 10 Phr | Ex. 11 Phr | Ex. 12 Phr |
|---|---|---|---|---|---|---|
| Polyamide | Nylon 11 | 100 | — | 100 | — | 100 |
| Resin | Nylon 12 | — | 100 | — | 100 | — |
| Conductive | Ketjen Black EC | — | 15 | 15 | 15 | — |
| Carbon Black | Ketjen Black EC600JD | 8 | — | — | — | 8 |
| Additives[1)] | Secondary Aromatic amine-C | 3 | — | — | — | — |
|  | Secondary Aromatic amine-D | — | 3 | — | — | — |
|  | Secondary Aromatic amine-E | — | — | 0.5 | — | — |
|  | Secondary Aromatic amine-F | — | — | — | 3 | — |
|  | Sedondary Aromatic amine-G | — | — | — | — | 3 |
| Tube Formability |  | ○ | ○ | ○ | ○ | ○ |
| Surface Resistivity (Ω/sq) |  | $8 \times 10^3$ | $4 \times 10^4$ | $2 \times 10^3$ | $4 \times 10^4$ | $7 \times 10^3$ |
| Bending after Circulation of FC/LP05 wt %[2)] |  | ○ | ○ | ○ | ○ | ○ |
| Elongation | Initial % | 300 | 330 | 290 | 340 | 300 |
| At Break | After being Aged % | 200 | 240 | 190 | 240 | 210 |

[1)]Additives:
Secondary Aromatic amine-C: Phenyl-1-naphthylamine (Nocrac PA)
Secondary Aromatic amine-D: Octylated diphenylamine (Nocrac AD-F)
Secondary Aromatic amine-E: N,N'-Diphenyl-p-phenylenediamine (Nocrac DP)
Secondary Aromatic amine-P: N,N'-Di-2-naphtyl-p-phenylenediamine (Nocrac White)
Secondary Aromatic amine-G: N-Phenyl-N'-isopropyl-p-phenylenediamine (Nocrac 810-NA)
[2)]FC/LP05 wt %: Artificially prepared oxygenated gasoline (Fuel Oil C containing 5 wt lauroyl peroxide)
Evaluation of bending:
○ = No abnormality;
X = Occurrence of crack

TABLE 3

|  |  | Ex. 13 Phr | Ex. 14 phr | Ex. 15 phr |
|---|---|---|---|---|
| Polyamide | Nylon 11 | 100 | 100 | 100 |
| Resin | Nylon 12 | — | — | — |
| Conductive | Ketjen Black EC | — | — | — |
| Carbon Black | Ketjen Black EC600JD | 8 | 8 | 8 |
| Additives[1)] | Secondary Aromatic amine-D | — | 3 | — |
|  | Secondary Aromatic amine-F | — | — | 3 |
|  | Secondary Aromatic amine-H | 3 | — | — |
| Tube Formability |  | ○ | ○ | ○ |
| Surface Resistivity (Ω/sq) |  | $6 \times 10^3$ | $3 \times 10^3$ | $5 \times 10^3$ |
| Bending after Circulation of FC/LP05 wt %[2)] |  | ○ | ○ | ○ |
| Elongation | Initial % | 310 | 290 | 310 |
| At Break | After being Aged % | 200 | 190 | 220 |

[1)]Additives:
Secondary Aromatic amine-D: Octylated diphenylamine (Nocrac AD-F)
Secondary Aromatic amine-F: N,N'-Di-2-naphtyi-p-phenylenediamine (Nocrac White)
Secondary Aromatic amine-H: N-Phenyl-N'-(1,3-dimethylbutyl) phenylenediamine (Nocrac 6C)
[2)]FC/LP05 wt%: Artificially prepared oxygenated gasoline (Fuel Oil C containing 5 wt lauroyl peroxide)
Evaluation of bending:
○ = No abnormality;
X = Occurrence of crack Comparative Example 1–5

Two-layer tubes were formed, in the same manner as in Examples 1–15, using polyamide, conductive carbon black and secondary aromatic amine in the ratio shown in Table 4, and the tube formability of the manufactured two-layer tubes were evaluated by a visual inspection by the naked eyes and the surface resistance and oxygenated-gasoline resistance of the inner layer of the tubes were measured by the test methods described above. Furthermore, the mechanical strength and heat-aging resistance of the test pieces comprising each of the compositions of polyamide/conductive carbon black/secondary aromatic amine were measured with said test methods. The results are shown in Table 4.

EXAMPLE 16

In the same manner as in Example 1 except that the polyamide used for the outer layer was replaced with a blend of NBR with vinyl chloride, a two-layer tube having an outer diameter of 14 mm was formed wherein a composition of polyamide/conductive carbon black/secondary aromatic amine was used as an inner layer. This two-layer tube was inserted into a EPDM tube which has a thickness of 2 mm and a hole having a diameter of 15 mm to form a two-layer tube protector structure of the present invention.

It has been confirmed that this tubular structure provided with the protector is useful as a fuel transport tube that can withstand mechanical or thermal shocks from outside over a long period.

TABLE 4

|  |  | Comp. Ex. 1 phr | Comp. Ex. 2 phr | Comp. Ex. 3 phr | Comp. Ex. 4 phr | Comp. Ex. 5 Phr |
|---|---|---|---|---|---|---|
| Polyamide Resin | Nylon 11 | 100 | 100 | 100 | 100 | 100 |
|  | Nylon 12 | — | — | — | — | — |
| Conductive Carbon Black | Ketjen Black EC | — | 5 | 11 | 18 | 18 |
|  | Ketjen Black EC600JD | — | — | — | — | — |
| Additives[1)] | Secondary Aromatic amine-A | — | — | — | — | — |
|  | Secondary Aromatic amine-B | — | 0.1 | 0.1 | — | 6 |
| Tube Formability |  | ○ | ○ | ○ | X | X[2)] |
| Surface Resistivity (Ω/sq) |  | 2 × 10$^{12}$ | 6 × 10$^{10}$ | 6 × 10$^3$ | 3 × 10$^2$ | 3 × 10$^2$ |
| Bending after Circulation of FC/LP05 wt %[3)] |  | ○ | X | X | X | ○ |
| Elongation At Break | Initial % | 410 | 300 | 210 | 150 | 250 |
|  | After being Aged % | 410 | 8 | 8 | 4 | 150 |

[1)]Additives:
Secondary Aromatic amine-A: p-(p-toluene sulfonylamide)diphenylamine (Nocrac TD)
Secondary Aromatic amine-B: 4,4'-bis(α,α-dimethyl-benzyl)diphenylamine (Nocrac CD)
[2)]Occurrence of bloom and gas was significant.
[3)]FC/LP05 wt %: Artificially prepared oxygenated gasoline (Fuel Oil C containing 5 wt lauroyl peroxide)
Evaluation of bending:
○ = No abnormality;
X = Occurrence of crack As the results shown above suggest, although a polyamide resin is, by nature, excellent in heat-aging resistance (Comparative Example 1), this feature is greatly impaired by the addition of conductive carbon black (Comparative Examples 2–4). In accordance with the present invention, however, the decrease in the heat-aging resistance can be remarkably suppressed (Examples 1–15) by the addition of the secondary aromatic amine. Additionally, by the addition of additives within a range of amounts specified in the present invention, well-balanced characteristics including excellent formability can be obtained.

Comparative Example 6

A composition comprising polyamide/conductive carbon black/phenol-type antioxidant was produced in the same manner as in Example 2 except that a phenol-type antioxidant (1,3,5-trimethyl-2,4,6-tris[3,5-di-tert-butyl-4-hydroxybenzyl] benzene)(SEENOX 326 produced by Chipro Kasei Inc.) instead of the secondary aromatic amine using the constituents in the same ratio as used in Example 2 shown in Table 1 and the test on the heat-aging resistance of the produced composition was performed. The results indicate that the initial breaking elongation was 250%, while that of the aged sample was 80% showing that the sample was largely deteriorated. The sample was subjected to aging in the deteriorated fuel oil by holding in the above-mentioned pseudo oxygenated-gasoline at 60° C. for 360 hours and measurement of the breaking elongation was also made in the same manner. The results indicate that the breaking elongation of the aged sample was 70% showing a remarkable deterioration.

INDUSTRIAL APPLICATION

By using a composition comprising polyamide, electrically conductive carbon black and secondary aromatic amine in accordance with the present invention, articles (shaped bodies) can be obtained which are excellent in formability, conductivity, fuel oil resistance, mechanical strength and heat-aging resistance. Therefore, through the use of the composition of the present invention as a most inner layer of a tube, a tube can be obtained which is suitable for transport of hydrocarbon fluid such as fuel and the like.

What is claimed is:

1. A conductive resin tube comprising one or more layers, wherein at least the most inner layer of the said tube comprising a conductive polyamide resin composition containing from 6 to 15 parts by weight of conductive carbon black and from 0.3 to 5 parts by weight of secondary aromatic amine for 100 parts by weight of a polyamide resin.

2. The conductive resin tube as described in claim 1, wherein the polyamide resin is nylon 11 or nylon 12.

3. The conductive resin tube as described in claim 1, wherein the tube has an outer layer comprising materials selected from a group of polyamide, epichlorohydrin rubber, NBR, a mixture of NBR with polyvinyl chloride, chlorosulfonated polyethylene rubber, chlorinated polyethylene rubber, acrylic rubber(ACM), chloroprene rubber(CR), ethylene-propylene rubber(EPR), ethylenepropylene diene rubber(EPDM), NBR-EPDM blend rubber and a thermoplastic elastomer containing vinyl chloride, olefin, ester or amide.

4. The conductive resin tube as described in claim 1, wherein the tube is used for the transport of fuel oil.

5. The conductive resin tube as described in any of claims 1 to 4, wherein the secondary aromatic amine is selected from a group of phenyl-α-naphthylamine, phenyl-β-naphthylamine, N-phenyl-N'-(p-toluene-sulfonyl)-p-phenylenediamine, 4,4'-bis(α,α-dimethyl-benzyl)-diphenylamine, reaction products of diphenylamine with acetone, reaction products of diphenylamine and aniline with acetone, substituted diphenylamine, N,N'-diphenyl-p-phenylenediamine and N,N'-di-2-naphthyl-p-phenylenediamine,octylated diphenylamine, N,N'-diphenyl-p-phenylenediamine, N,N'-di-2-naphthyl-p-phenylenediamine, N-phenyl-N'-isopropyl-p-phenylenediamine, N-phenyl-N'-(1,3-dimethylbutyl) phenylenediamine.

6. A conductive resin tube structure comprising a single- or multi-layer conductive resin tube and a protective member disposed partially or totally on the outer peripheral surface of the tube, at least the most inner layer of the said tube comprising a conductive polyamide resin composition containing from 6 to 15 parts by weight of conductive carbon black and from 0.3 to 5 parts by weight of secondary aromatic amine for 100 parts by weight of a polyamide resin.

7. The conductive resin tube structure as described in claim 6, wherein the protective member is a member of solid or sponge form comprising a material selected from ethylene-propylene rubber(EPR), ethylene-propylene diene rubber(EPDM) and a thermoplastic elastomer containing vinyl chloride or olefin.

8. The conductive resin tube structure as described in claims 6 or 7, wherein the secondary aromatic amine is selected from a group of phenyl-x-naphthylamine, phenyl-β-naphthylamine, N-phenyl-N'-(p-toluene-sulfonyl)-p-phenylenediamine, 4,4'-bis(α,α-dimethyl-benzyl)-diphenylamine, reaction products of diphenylamine with acetone, reaction products of diphenylamine and aniline with acetone, substituted diphenylamine, N,N'-diphenyl-p-phenylenediamine and N,N'-di-2-naphthyl-p-phenylenediamine, octylated diphenylamine, N,N'-diphenyl-p-phenylenediamine, N,N'-di-2-naphthyl-p-phenylenediamine, N-phenyl-N'-isopropyl-p-phenylenediamine, N-phenyl-N'-(1,3-dimethylbutyl) phenylenediamine.

* * * * *

UNITED STATES PATENT AND TRADEMARK OFFICE
CERTIFICATE OF CORRECTION

PATENT NO.    : 6,267,148 B1
DATED         : July 31, 2001
INVENTOR(S)   : Kazutaka Katayama et al.

Page 1 of 1

It is certified that error appears in the above-identified patent and that said Letters Patent is hereby corrected as shown below:

<u>Title page,</u>
Item [75], Inventors, replace "city of all inventors" with -- Aichi-Ken, Japan --.

<u>Column 8,</u>
Table 1, line 5, under heading Ex. 1/Phr. replace "11" with -- - --.

<u>Column 9,</u>
Table 2, under 1) Additives replace "Secondary Aromatic Amine-P" with -- Secondary Aromatic Amine-F --.

Signed and Sealed this

Nineteenth Day of March, 2002

Attest:

JAMES E. ROGAN
*Director of the United States Patent and Trademark Office*

*Attesting Officer*